United States Patent
Hart et al.

(10) Patent No.: US 12,030,527 B2
(45) Date of Patent: *Jul. 9, 2024

(54) VEHICLE MANAGEMENT

(71) Applicant: BRITISH TELECOMMUNICATIONS PUBLIC LIMITED COMPANY, London (GB)

(72) Inventors: Jonathan Hart, London (GB); Ruth Brown, London (GB); Maria Cuevas Ramirez, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 206 days.

This patent is subject to a terminal disclaimer.

(21) Appl. No.: 17/436,339

(22) PCT Filed: Feb. 21, 2020

(86) PCT No.: PCT/EP2020/054701
§ 371 (c)(1),
(2) Date: Sep. 3, 2021

(87) PCT Pub. No.: WO2020/182446
PCT Pub. Date: Sep. 17, 2020

(65) Prior Publication Data
US 2022/0177009 A1    Jun. 9, 2022

(30) Foreign Application Priority Data
Mar. 8, 2019  (EP) .................................. 19161722

(51) Int. Cl.
*B60W 60/00*   (2020.01)
*G06Q 10/0832* (2023.01)
(Continued)

(52) U.S. Cl.
CPC ... *B60W 60/00256* (2020.02); *G06Q 10/0832* (2013.01); *G07C 5/008* (2013.01);
(Continued)

(58) Field of Classification Search
CPC ........ B60W 60/00256; B60W 2556/65; G06Q 10/0832; G07C 5/008; G08G 5/0056; G08G 5/0069; G05D 1/0206; G05D 1/0212
(Continued)

(56) References Cited

U.S. PATENT DOCUMENTS 9,087,451 B1 *  7/2015  Jarrell ................... G08G 5/003
9,354,296 B2    5/2016  Ubhi et al.
(Continued)

FOREIGN PATENT DOCUMENTS

CN    106465159    2/2017
CN    106575389    4/2017
(Continued)

OTHER PUBLICATIONS

International Search Report and Written Opinion of the ISA for PCT/EP2020/054701 dated May 26, 2020, 12 pages.
(Continued)

*Primary Examiner* — Isaac G Smith
(74) *Attorney, Agent, or Firm* — Nixon & Vanderhye P.C.

(57) ABSTRACT

A method of controlling an Autonomous Vehicle (AV) 110, comprising the steps of: detecting a fault in a first AV 110-1; in response to detecting said fault, transmitting a communication for alerting an AV of the fault, wherein said communication is a device-to-device wireless communication; receiving said communication at a second AV 110-2; identifying the second AV as being capable of retrieving at least part of the first AV and delivering said at least part to an
(Continued)

intended destination; and instructing the second AV to perform the retrieving and delivering.

22 Claims, 4 Drawing Sheets

(51) Int. Cl.
*G07C 5/00* (2006.01)
*G08G 5/00* (2006.01)
*G05D 1/00* (2006.01)

(52) U.S. Cl.
CPC ....... *G08G 5/0056* (2013.01); *B60W 2556/65* (2020.02); *G05D 1/0206* (2013.01); *G05D 1/0212* (2013.01); *G05D 1/101* (2013.01); *G08G 5/0069* (2013.01)

(58) Field of Classification Search
USPC .......................................................... 701/3
See application file for complete search history.

(56) References Cited

U.S. PATENT DOCUMENTS

| | | | |
|---|---|---|---|
| 9,387,928 B1* | 7/2016 | Gentry | B60L 53/00 |
| 9,454,157 B1* | 9/2016 | Hafeez | G05D 1/104 |
| 9,514,653 B2 | 12/2016 | Cheatham, III et al. | |
| 9,524,648 B1 | 12/2016 | Gopalakrishnan et al. | |
| 9,875,965 B2 | 1/2018 | Fu et al. | |
| 10,730,626 B2* | 8/2020 | Gil | G08G 5/006 |
| 2015/0239436 A1 | 8/2015 | Kanai et al. | |
| 2016/0225264 A1* | 8/2016 | Taveira | H04W 48/04 |
| 2016/0297521 A1 | 10/2016 | Cheatham, III et al. | |
| 2016/0300496 A1* | 10/2016 | Cheatham, III | G08G 5/0013 |
| 2017/0150373 A1* | 5/2017 | Brennan | H04W 4/40 |
| 2017/0253345 A1* | 9/2017 | Katz | G08G 5/0069 |
| 2018/0040171 A1 | 2/2018 | Kundu et al. | |
| 2018/0157255 A1 | 6/2018 | Halverson et al. | |
| 2018/0196437 A1 | 7/2018 | Herbach et al. | |
| 2018/0294871 A1 | 10/2018 | Kosseifi et al. | |
| 2018/0300834 A1 | 10/2018 | High et al. | |
| 2019/0289469 A1* | 9/2019 | Bentley | H04W 16/10 |
| 2020/0331607 A1* | 10/2020 | Yamada | G08G 5/0013 |

FOREIGN PATENT DOCUMENTS

| | | |
|---|---|---|
| CN | 107527510 | 12/2017 |
| CN | 109150650 | 1/2019 |
| CN | 109204131 | 1/2019 |
| GB | 2553668 | 3/2018 |
| WO | 2014/080387 | 5/2014 |
| WO | 2018/108262 | 6/2018 |
| WO | 2019/055183 | 3/2019 |

OTHER PUBLICATIONS

Extended Search Report for EP19161722.4 dated Jun. 7, 2019, 8 pages.
Extended Search Report for EP19164017.6 dated Nov. 19, 2019, 6 pages.
Examination Report for GB1903783.7 dated Jul. 19, 2021, 3 pages.
Combined Search and Examination Report for GB1903159.0 dated Sep. 9, 2019, 8 pages.
Combined Search And Examination Report for GB1903783.7 dated Sep. 23, 2019, 6 pages.
International Preliminary Report on Patentability for PCT/EP2020/054702 dated Aug. 18, 2020, 7 pages.
International Search Report and Written Opinion of the ISA for PCT/EP2020/054702 dated Apr. 24, 2020, 11 pages.
Pre-filing Search Report (A33761), Novelty Search Report, Topic—A33761—Drone Relaying, dated Oct. 19, 2018, 36 pages.
Translation of Office Action dated Dec. 28, 2023, issued for Chinese Application No. 202080018951.5 (15 pages).

* cited by examiner

VEHICLE MANAGEMENT

This application is the U.S. national phase of International Application No. PCT/EP2020/054701 filed 21 Feb. 2020, which designated the U.S. and claims priority to EP Patent Application No. 19161722.4 filed 8 Mar. 2019, the entire contents of each of which are hereby incorporated by reference.

FIELD OF INVENTION

The present invention relates to a method of managing an Autonomous Vehicle (AV), a system therefor and to an AV.

BACKGROUND

Autonomous Vehicles (AVs), such as autonomous cars or drones, may be used for logistics. In particular, such AVs may be used to deliver packages from a distribution centre to a delivery address.

In many cases, AVs source electrical power for propulsion from an internal battery. Such AVs therefore have limited range due to limited battery supply, typically providing less than an hour's worth of travel (and in many cases only 20-30 minutes). This significantly limits the logistical uses of such AVs. In an effort to counter this limitation, AVs may be made to be lightweight, which in turn may render them fragile and therefore prone to mechanical failures.

An AV may be provided with a cellular network interface so as to communicate with a control centre, for example to update the control centre as to the state of the AV, and in particular if a fault has arisen in the AV. The control centre may then take remedial action, such as instructing the AV to take a particular action. However, a cellular network may fail or may not be available in the vicinity of the AV, in which case the control centre may not be made aware of the fault in the AV or no remedial action may be taken.

In view of the above, it is an aim of the present invention at least to alleviate some of the aforementioned problems.

STATEMENTS OF INVENTION

According to a first aspect of the present invention, there is provided a method of controlling an Autonomous Vehicle (AV), comprising the steps of: detecting a fault in a first AV; in response to detecting said fault, transmitting a communication for alerting an AV of the fault, wherein said communication is a device-to-device wireless communication; receiving said communication at a second AV; identifying the second AV as being capable of retrieving at least part of the first AV and delivering said at least part to an intended destination; and instructing the second AV to perform the retrieving and delivering.

Preferably, as used herein, a "fault" in the context of an AV is any existing and/or anticipated condition that prevents and/or that may prevent the AV from operating and/or from operating as intended (e.g. safely and/or efficiently); in particular, this includes mechanical, electrical and computational faults, as well as environmental conditions (e.g. weather).

Preferably, as used herein, a "device-to-device wireless communication" connotes a network communication, communicated over a wireless network, that is transmitted from a first mobile device and capable of being received by (and is intelligible to) a second mobile device, without the communication having been communicated between the two mobile devices via a base station (such as a Radio Access Network access point), backhaul and/or core network. Preferably, the device-to-device wireless communication is communicated according to protocols for cellular network communications, including the 2G, 3G, 4G and 5G protocols.

Preferably, the device-to-device wireless communication is communicated with sufficient power so as to permit communication over a wide area, wherein the wide area includes (in ideal conditions) a point at least 250 meters, more preferably at least 500 meters, still more preferably at least 1,000 meters, and yet more preferably at least 2,500 meters away from the transmission source.

Preferably, the device-to-device communication is transmitted with a power of at least 0.25 Watts, more preferably at least 0.5 Watts, still more preferably 2 Watts, and even more preferably at least 3 Watts.

Preferably, the device-to-device communication is transmitted within a portion of the electro-magnetic spectrum that is licenced (or exclusively permitted) for wide area telecommunications, and in particular for cellular telecommunication.

Optionally, the device-to-device communication is capable of being—but need not be—received, processed and/or transmitted to its intended destination via a cellular telecommunication network, including a (cellular) base station, backhaul and/or a core network.

Optionally, the device-to-device communication excludes Wi-Fi™ and Bluetooth™.

Optionally, the communication for alerting an AV of the fault also instructs the second AV to perform the retrieving and delivering.

Preferably, the first and second AV comprise a transceiver for receiving and/or issuing, at least, a device-to-device communication.

Preferably, the at least part of the first AV is: a payload of the first AV; the first AV, with or without a payload; and/or part of the first AV, with or without a payload. Optionally, the at least part of the first AV is only a payload of the first AV. Optionally, the first AV comprises means for transporting a payload, which may be in the form of a cargo bay or a structure for carrying a payload. Optionally, the part of the first AV, excluding a payload, is debris. Where the at least part of the first AV includes the or part of the AV with a payload, the second AV may deliver the payload to a different location to the remaining part of the AV (which may be delivered for repair or disposal).

Preferably, identifying the second AV is performed by the first and/or second AV.

Preferably, instructing the second AV is performed by the first AV. Optionally, the step/s of identifying and/or instructing the second AV is/are performed by the second AV. Optionally, the step/s of identifying and/or instructing the second AV is/are performed at a location that is remote to both the first and second AVs.

Preferably, instructing the second AV is performed by means of the, or a further, device-to-device wireless communication.

Preferably, the device-to-device wireless communication is received by the second AV via at least one intermediate AV. Optionally, the further device-to-device wireless communication is received by the second AV via at least one intermediate AV. Optionally, instructing the second AV is communicated via at least one intermediate AV. The device-to-device wireless communication may directly be received by the second AV without retransmission by an intermediate AV.

Preferably, the first AV detects the fault. Optionally, the first AV identifies the fault. Optionally, the method further comprises the step of a controller remote from the first and/or second AV/s detecting and/or identifying the fault in the first AV, in turn the controller may cause transmission of the communication for alerting an AV of the fault.

Preferably, the first AV ceases travel in response to detecting the fault.

Optionally, the identification of the second AV and/or the instructions for the second AV are dependent on the identified fault in the first AV.

Preferably, the device-to-device wireless communication comprises a current location of the first AV. Preferably, the second AV travels to said current location so as to retrieve the at least part of the first AV.

Optionally, the device-to-device wireless communication comprises a future destination of the first AV. Preferably, the second AV travels to said future destination so as to retrieve the at least part of the first AV at said future destination. Preferably, said future destination is not the current location or the intended destination.

Preferably, the device-to-device wireless communication comprises information regarding the at least part of the first AV that is to be retrieved and delivered. Optionally, said information comprises: weight; dimensions; intended destination, including an intended recipient and/or location for delivery; whether the at least part (and in particular, payload) is fragile; a delivery priority level; specific handling instructions; and/or an intended handling orientation.

Preferably, the first AV is carrying a plurality of payloads to an/a plurality of intended destination/s, and wherein a plurality of second AVs are identified and instructed to retrieve and to deliver the plurality of payloads to the/the plurality of intended destination/s. Optionally, the plurality of payloads are collected by the plurality of seconds AVs in a sequence according to a priority assigned to each payload.

Preferably, the first and/or second AV is unmanned. Optionally, the at least part of the first AV comprises a passenger. The first and/or second AV may be an aerial (including a space vehicle), marine (including a submarine) and/or ground vehicle (including a hovercraft).

Preferably, the method is performed when the first AV and/or the second AV are unable to communicate with a cellular wide area network. Optionally, the method is performed only when the first AV and/or the second AV are/is unable to communicate with a cellular wide area network.

Preferably, the device-to-device communication is communicated using a portion of the electromagnetic spectrum that is licenced for wide area cellular telecommunications. Preferably, the device-to-device communication is an LTE Direct protocol-compliant communication.

Preferably, at least a part of the device-to-device communication is encrypted. Preferably, the device-to-device communication is encrypted at least to encrypt: the location of the first AV (including a future rendezvous location); the intended destination of the payload; and/or information associated with the payload.

According to another aspect of the invention, there is provided an Autonomous Vehicle (AV) comprising: means for detecting a fault in the AV; a transmitter for transmitting a communication for alerting a recovery AV of the fault, wherein said communication is a device-to-device wireless communication; a processor configured to: identify a recovery AV as being capable of recovering at least part of the AV and to deliver said at least part to an intended destination; and instruct the identified recovery AV to perform the retrieving and delivering.

Optionally, the means for detecting the fault is a sensor and/or a telecommunications receiver.

According to yet another aspect of the invention, there is provided an Autonomous Vehicle (AV) comprising: a receiver for receiving a communication providing notice that a faulty AV has a fault, wherein said communication is a device-to-device wireless communication; means for carrying a payload; and a processor configured to instruct the AV to retrieve, by the means for carrying a payload, at least part of the faulty AV and to deliver said at least part to an intended destination.

According to still another aspect of the invention, there is provided a system for managing Autonomous Vehicles (AVs) for delivering a payload, comprising: a first AV comprising: means for detecting a fault in the first AV; and a transmitter for transmitting a communication for alerting a second AV of the fault, wherein said communication is a device-to-device wireless communication; a second AV comprising: a receiver for receiving said device-to-device wireless communication; and means for carrying a payload; a first processor for identifying the second AV as being capable of recovering at least part of the first AV and of delivering said at least part to an intended destination; and a second processor for instructing the second AV to perform the recovering and delivering.

Optionally, the first and/or second processor/s is/are arranged in: the first AV; second AV; or remote to both the first and second AVs. Optionally, the first processor is also the second processor. Optionally, the receiver is a transceiver for communicating said device-to-device wireless communication on to a further network location, wherein said further network location comprises the first processor.

The invention extends to any novel aspects or features described and/or illustrated herein. The invention extends to methods and/or apparatus substantially as herein described and/or as illustrated with reference to the accompanying drawings. The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention also provides a signal embodying a computer program for carrying out any of the methods described herein and/or for embodying any of the apparatus features described herein, a method of transmitting such a signal, and a computer product having an operating system which supports a computer program for carrying out any of the methods described herein and/or for embodying any of the apparatus features described herein.

Any apparatus feature as described herein may also be provided as a method feature, and vice versa. As used herein, means plus function features may be expressed alternatively in terms of their corresponding structure, such as a suitably programmed processor and associated memory.

Any feature in one aspect of the invention may be applied to other aspects of the invention, in any appropriate combination. In particular, method aspects may be applied to apparatus aspects, and vice versa. Furthermore, any, some and/or all features in one aspect can be applied to any, some and/or all features in any other aspect, in any appropriate combination. It should also be appreciated that particular combinations of the various features described and defined in any aspects of the invention can be implemented and/or supplied and/or used independently.

In this specification the word 'or' can be interpreted in the exclusive or inclusive sense unless stated otherwise.

Furthermore, features implemented in hardware may generally be implemented in software, and vice versa. Any reference to software and hardware features herein should be construed accordingly.

The invention extends to a method of controlling an Autonomous Vehicle, to an Autonomous Vehicle and to a system for managing Autonomous Vehicles as described herein and/or substantially as illustrated with reference to the accompanying drawings. The present invention is now described, purely by way of example, with reference to the accompanying diagrammatic drawings, in which:

SPECIFIC DESCRIPTION

Figure 1:
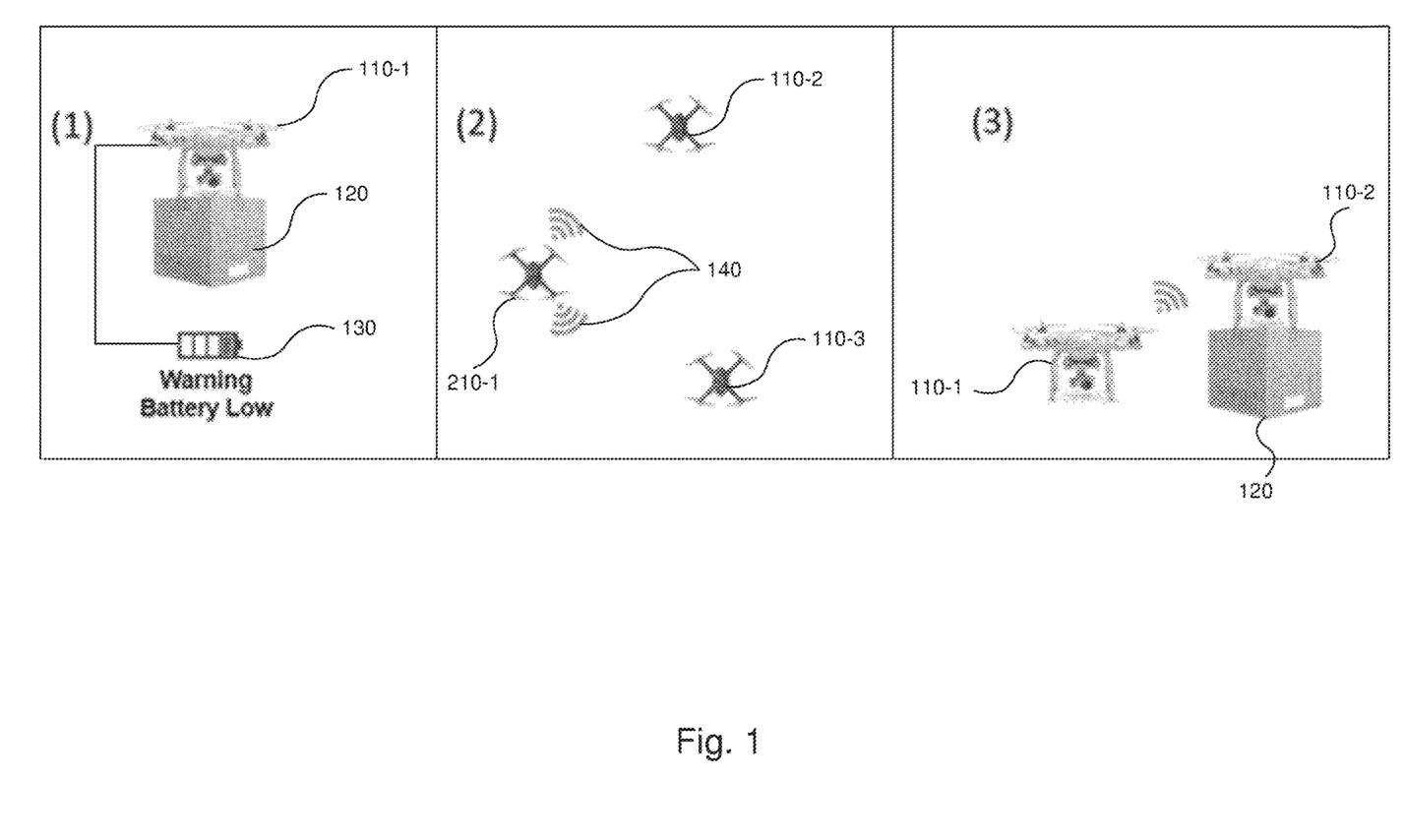
FIG. 1 shows an Autonomous Vehicle (AV) performing a recovery operation.

FIG. 1 shows a first Autonomous Vehicle (AV) 110-1, in the form of an aerial vehicle (or so-called "drone") that has been designated a task (herein referred to as a 'designated task') for it to execute. In the example of FIG. 1, the designated task of the first AV is delivery of a payload 120 to an intended destination.

Figure 2:
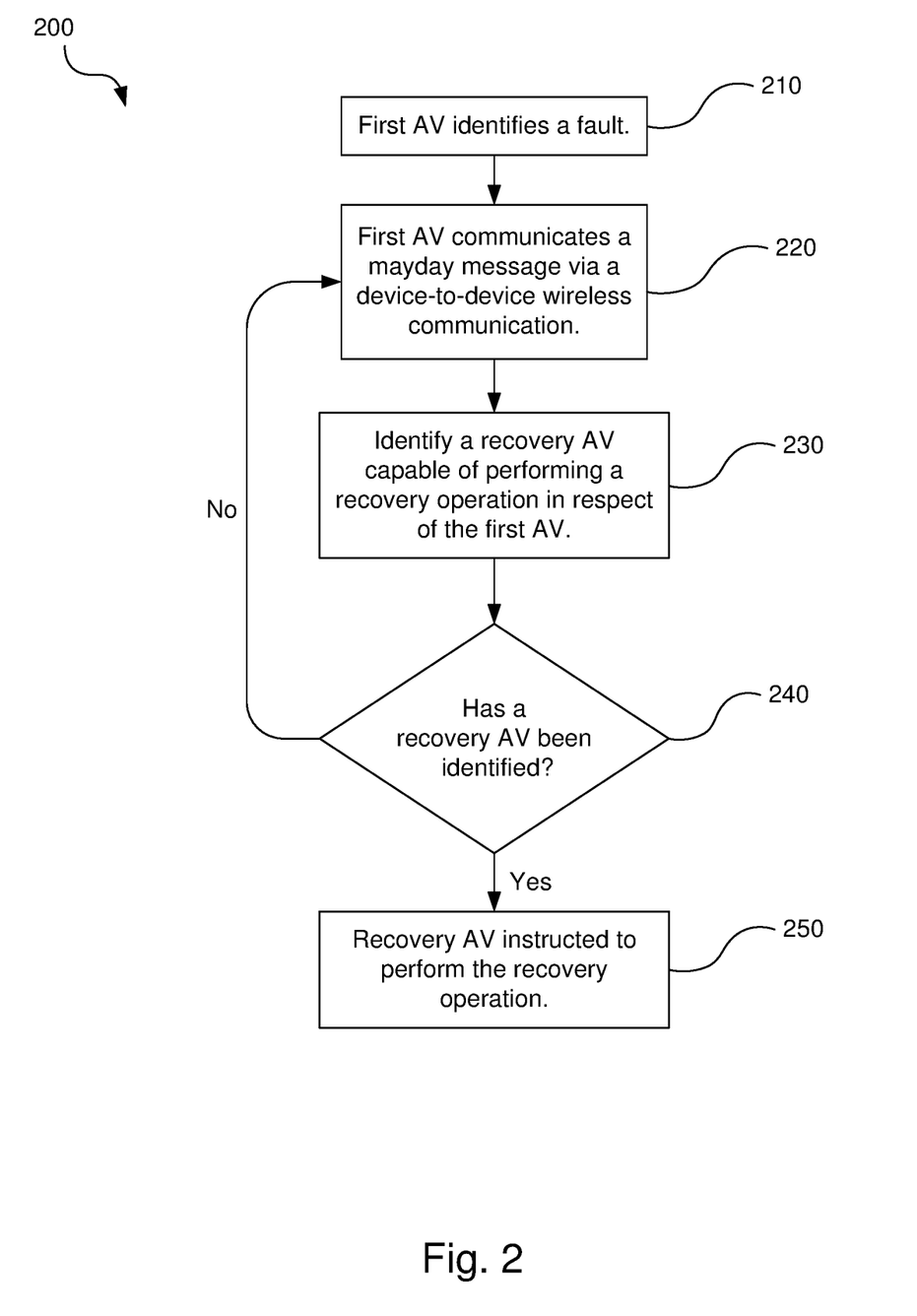
FIG. 2 shows an overview of a process for executing the recovery operation by an AV.

FIG. 2 shows, in general, a process 200 of managing the first AV 110-1, and in particular of performing an operation to recover the payload 120 from the first AV by means of another AV and then to complete the designated task (herein referred to as a 'recovery operation').

In a first step 210, the first AV 110-1 identifies a fault affecting its ability to perform its designated task, or to do so safely and/or efficiently, and so the first AV is designated as a 'faulty AV'.

As shown in FIG. 1, the first AV comprises a battery 130 for powering movement of the first AV, and in this example, and in accordance with step 210, the first AV detects (and identifies) a fault in the form of insufficient battery power.

In response to detecting the fault 210, the first AV 110-1 broadcasts 220 a communication 140 for alerting other AVs that the first AV has a fault (herein referred to as a 'mayday message'); this mayday message is in the form of a device-to-device communication, which is communicated by means of a transmitter (not shown) provided as part of the first AV 110-1.

Since the mayday message is in the form of a device-to-device communication, it is capable of being received by, and it is directly intelligible to, a remote device without the communication traversing an access point and/or a network core of a telecommunications network, such as a cellular or satellite network, yet the communication 140 is transmitted as a wide area communication (i.e. it has sufficient power to traverse a wide geographic area, especially where communicating AVs are at high altitude, such as when in flight) and/or within a portion of the electromagnetic spectrum that is licenced for wide area communication (e.g. 2.535-2.690 GHz), and in particular for cellular communications.

In the examples shown in and described with reference to FIGS. 1 and 2, the remote device that receives the device-to-device communication is formed as part of another AV, such as a second 110-2 and a third 110-3 AV, as shown in FIG. 1.

At step 230, an assessment is made by the first AV as to whether a response to the mayday message has been received by the first AV, from, at least one other AV (for example, the second 110-2 and/or third 110-3 AV/s).

If so, following issuance of a response to the mayday message by at least one other AV (which is/are therefore designated as a 'candidate recovery AV'), process 200 continues by determining if the at least one other AV is capable of performing the recovery operation in respect of the payload 120 at step 230.

If no response is received by the first AV (and therefore no recovery AV identified), as assessed at step 240, then the first AV reissues the mayday message (therefore reiterating the process 200 from step 220).

In this example, the recovery operation includes retrieving the payload 120 and continuing the delivery of the payload to its intended destination (i.e. completing the designated task of the first AV 110-1).

If, at steps 230 and 240, an AV is identified as being capable of performing the recovery operation (herein referred to as the 'recovery AV'), the identified recovery AV is instructed to perform the recovery operation 250.

In one example the recovery AV is instructed to travel to retrieve the payload from a current location of the first AV. In another example, the recovery AV is instructed to retrieve the payload from the first AV at a future intended destination (also referred to as a 'rendezvous location').

If, however, at steps 230 and 240, no recovery AV is identified as being capable of performing the recovery operation, then the first AV reissues the mayday message (therefore reiterating the process 200 from step 220).

In the example shown in and described with reference to FIG. 1, the first AV 110-1 broadcasts a mayday message (as per step 220 of FIG. 2) that is received by both the second AV 110-2 and the third AV 110-3. The second AV 110-2 is subsequently identified as the recovery AV, and it is therefore instructed to perform the recovery operation so as to recover the payload 120 from the first AV 110-1 and to continue delivery of the payload to its intended destination.

Faults in the first AV include mechanical and electrical faults, such as damage to a motor or rotor blade, low battery power and software faults. Furthermore, adverse environmental conditions are also available to be sensed as a fault, and include, for example: adverse weather conditions (e.g. high winds, cold weather, heavy precipitation and thunder storms); obstructions (e.g. buildings, trees, terrain and other vehicles, in particular aircraft); natural disasters (e.g. fires); and malicious attempts at interference (e.g. vandalism and theft).

A fault is detected by the first AV using appropriate sensors and/or by receiving a network communication informing the AV of a fault (in particular where the fault relates to environmental conditions). Detection of a fault by the first AV is available to be performed in anticipation of a fault developing or in response to a fault having developed.

A fault in the first AV is capable of being detected, for example, by:
  the first AV 110-1 directly, in particular by means of an appropriate sensor, such as a battery level sensor;
  a remote management centre (not shown) for managing the first AV, for example by means of a wireless network communication (e.g. a wide area network communication, including a cellular network communication); and/or
  identifying a fault by means of the remote management centre is most appropriate (but not exclusively) for
    identifying an adverse environmental condition;
    the wireless network communication is available to be broadcast, multicast or unicast;

an issuing AV that is not the first AV 110-1, the issuing AV itself detecting a fault and then sending a wireless network communication to, at least, the first AV thereby to allow the first AV effectively to detect the fault also;

the wireless network communication is either a wide or a local area network communication, the latter having the advantage of being localised (the extent of which will depend, not least, on environmental conditions and the transmission power of the communication) to the vicinity of the issuing AV, and therefore may also be localised to the area of an adverse environmental condition;

likewise, the wireless network communication is available to be a broadcast, multicast or unicast communication;

it will be appreciated that, whilst the issuing AV is not the first AV 110-1, it may nonetheless be a first AV, in the sense the issuing AV has itself detected a fault associated with itself that renders the issuing AV the subject of a recovery operation. Alternatively, the issuing AV is also available to be the second AV 110-2 (i.e. a candidate recovery AV);

the issuing AV is available to have detected the fault itself directly or by means of the remote management centre (as described above).

In one example, the mayday message is at least a flag to indicate the existence of a fault.

The mayday message is also available to include any of:

an identifier that uniquely identifies the first AV, such as an International Mobile Equipment Identity (IMEI);

a current geographical location of the first AV (e.g. as retrieved from a GPS module provided as part of the first AV);

a future (intended) geographic location of the first AV, for example a rendezvous location for the first AV and the recovery AV;

details regarding the designated task, including:
  the importance/priority of the designated task (e.g. a low-priority delivery, such as for a basic consumer good, or a high-priority delivery, such as blood for transfusion); and/or
  details regarding the intended destination of the payload, including:
    geographical co-ordinates, an address, and/or an identifier of a recipient; and/or
    an intended route to be taken to the intended destination (e.g. a fastest or a most energy-efficient route);

details regarding the nature of the fault identified by the first AV; and/or
  this is available to be used by a candidate recovery AV to help assess whether it is suitable to perform the recovery operation, since a recovery operation may be ineffective if the identified fault may cause a fault to the candidate recovery AV (e.g. if the fault is an intense forest fire);

details regarding the payload, including:
  dimensions;
  mass;
  orientation with which it is to be handled;
  whether it is fragile;
  whether it is a dangerous payload (e.g. containing toxic chemical or explosives, such as in the case of fireworks); and/or
  where the payload is a plurality of individual items, the number of such items (as well as any of the aforementioned details as applicable to each such item) and/or the items that are to be recovered, if not all, by a given recovery operation.

It will be appreciated that the payload can comprises any form of physical object. In one example, the payload is: a package (e.g. comprising goods, waste and/or refuse); another AV; a passenger; or a combination thereof.

Figure 3:
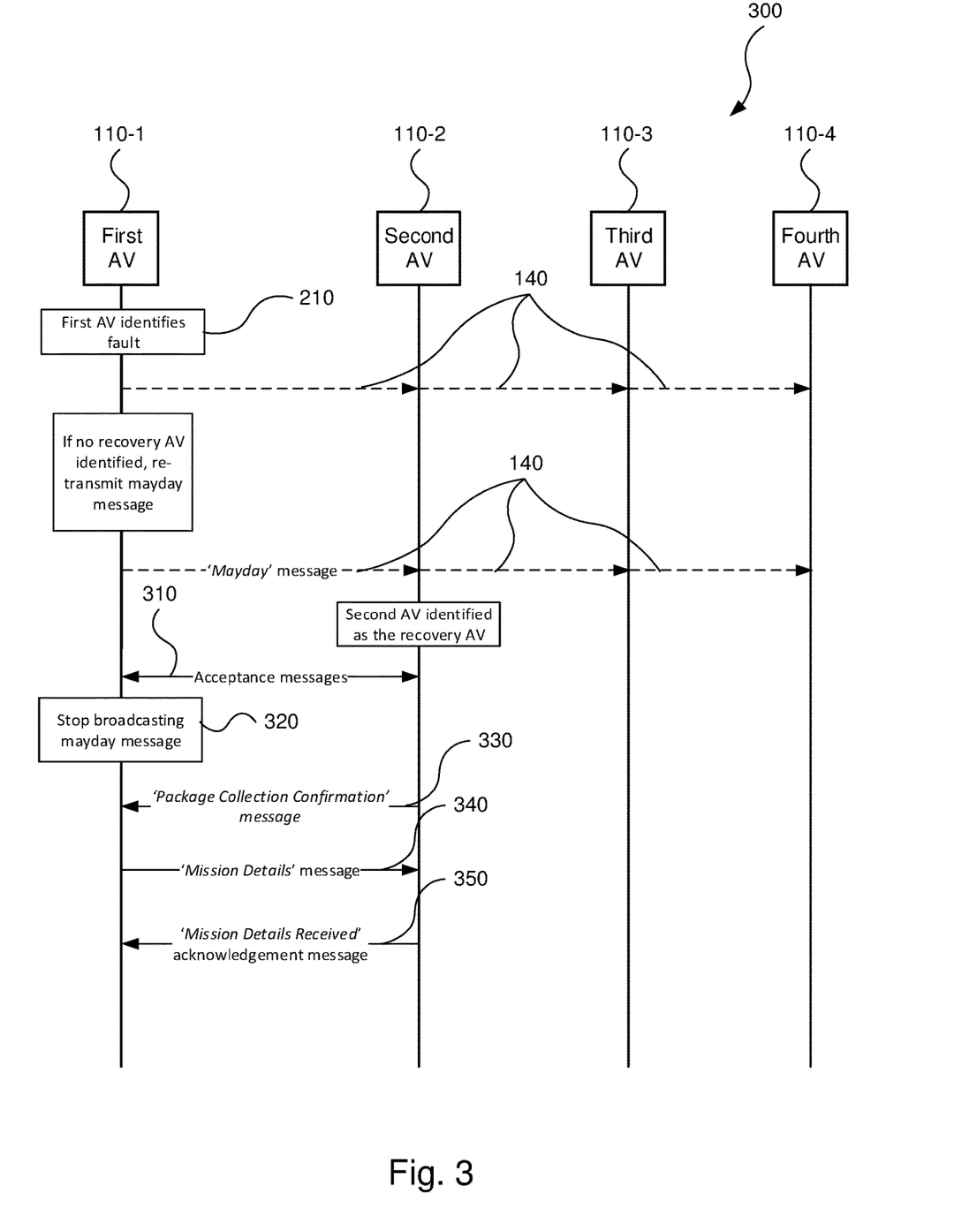
FIG. 3 is a signalling diagram illustrating signalling amongst AVs so as to effect the recovery operation.

FIG. 3 is a signalling diagram 300 illustrating, communication of the mayday message as a device-to-device communication and subsequent communication between AVs so as to facilitate the recovery operation.

As described above, the first AV—having detected a fault, as per step 210 described above—issues a mayday message 140 in the form of a wireless device-to-device communication; this communication is received by the second AV 110-2 and by the third AV 110-3, as well as by a fourth AV 110-4. The mayday message is received by each AV directly from the first AV.

The device-to-device communication is, for example, issued and/or received by—in accordance with the LTE Direct protocol—a PC5 interface of communications equipment integrated within each of the communicating AVs 110.

In this example, each candidate recovery AV (i.e. the second 110-2, third 110-3 and fourth 110-4 AVs) that deems itself to be suitable for performing the recovery operation issues an acceptance message 310 to the first AV 110-1 in response to the mayday message. Of the candidate recovery AVs from which an acceptance message 310 is received by the first AV (i.e. the second AV), the first AV selects a recovery AV and responds with its own acceptance message 310, effectively instructing the selected recovery AV (i.e. the second AV) to perform the recovery operation. The recovery AV is, for example, selected as the candidate recovery AV from which an acceptance message is first received by the first AV 110-1.

If no recovery AV is identified, then as per step 250 shown in, and described with reference to, FIG. 2, the first AV retransmits the mayday message.

Once a recovery AV is identified (in this example the second AV 110-2), the first AV then ceases transmitting the mayday message 320.

Once the second AV has recovered the payload from the first AV, the second AV issues to the first AV a communication acknowledging retrieval of the payload 120 (or a "package collection communication") 330, in response to which the first AV communicates details regarding the designated task (also referred to as "mission details") 340 so that the second AV may complete the designated task, and the second AV acknowledges receipt of the details regarding the designated task 350.

Communications 330, 340 and 350 are available to be communicated as device-to-device communications or are alternatively communicated as any other form of wireless communication, in particular as a local area communication (e.g. via Bluetooth™), given that the first AV and the second AV are likely to be proximate to one another at these stages.

Identifying a recovery AV is performed in dependence on the capability of a candidate recovery AV being able to perform the recovery operation.

The step of identifying a recovery AV is available to be performed either by:
  the first AV 110-1;
    for example, each candidate recovery AV having responded to mayday message from the first AV with details regarding their capabilities (e.g. battery level, maximum payload mass permitted to be carried), and from these responses the first AV is then configured to select the best candidate recovery AV as the recovery AV;

an AV that is not a candidate recovery AV, but is instead another first AV that has already selected a recovery AV (e.g. an issuing AV, as described above);

this reduces network signalling since the first AV that has selected a recovery AV may already have a list of candidate recovery AVs and knowledge of their capabilities;

a candidate recovery AV; or for example, once candidate recovery AVs have received the mayday message, each candidate recovery AV assesses its own capability to complete the recovery operation, and the first to do so broadcasts an acceptance message, which identifies it as the recovery AV and alerts the remaining candidate AVs; or for example, once candidate recovery AVs have received the mayday message, each candidate recovery AV sends its capability information to a designated central candidate recovery AV for the central candidate recovery AV to select the recovery AV;

a remote management centre;

for example, each candidate recovery AV sends capability information to the remote management centre, and the remote management centre identifies the recovery AV (and communicates this to the recovery AV).

Figure 4:
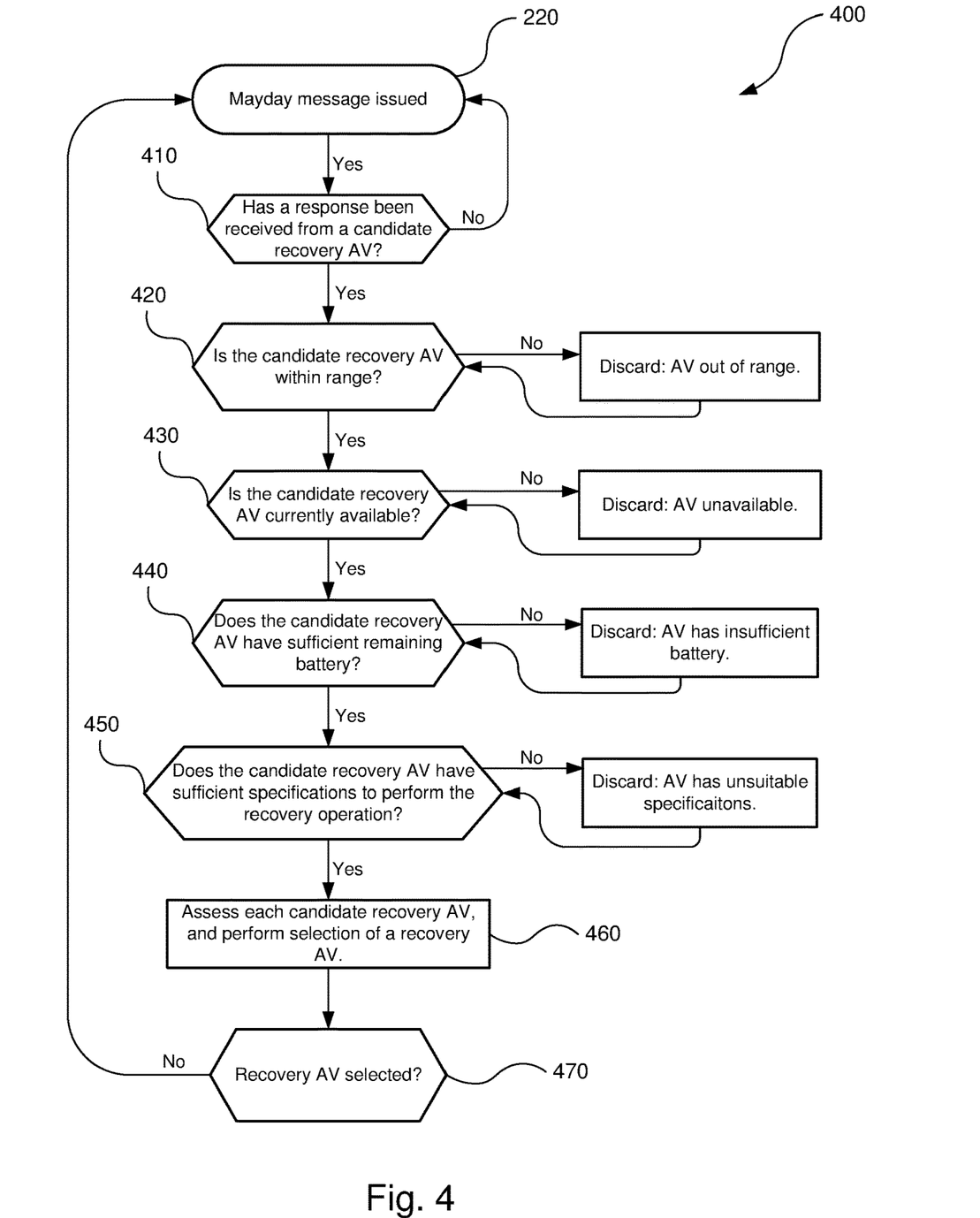
FIG. 4 shows a process of identifying an AV to perform the recovery operation.

FIG. 4 shows an exemplary process 400 for selecting a recovery AV.

In a first step 220, a mayday message is issued (as described above). An assessment is then made as to whether a response to the mayday message has been received, including capability information, from a candidate recovery AV (e.g. the second AV 110-2). In steps 420 to 450 sequential assessments are made as to the ability of the candidate recovery AV to perform the recovery operation, including whether the candidate recovery AV is:

within a threshold distance of the first AV (e.g. within 10 mile) 420;

if not, the candidate recovery AV is no longer considered for selection as a recovery AV and this step 420 repeats after a pre-defined period of time (in case the candidate recovery AV is later within range);

if so, the process proceeds to step 430;

currently available (e.g. not itself already on a designated task) 430;

if not, the candidate recovery AV is no longer considered for selection as a recovery AV and this step 430 repeats after a pre-defined period of time (in case the candidate recovery AV is later available);

if so, the process proceeds to step 440;

sufficiently charged so as to be able to perform the recovery operation (e.g. at least to be able to travel to the first AV, retrieve the payload and then complete the designated task); and if not, the candidate recovery AV is no longer considered for selection as a recovery AV and this step 440 repeats after a pre-defined period of time (in case the candidate recovery AV has been charged up);

if so, the process proceeds to step 450;

able to retrieve the payload to the extent that its specifications permit it to do so (e.g. it has sufficient space within its cargo bay) 450;

if not, the candidate recovery AV is no longer considered for selection as a recovery AV and this step 440 repeats after a pre-defined period of time (e.g. in case the candidate recovery AV later frees space within its cargo bay);

if so, the process proceed to step 460.

If the candidate recovery AV has passed all of the sequential assessments (i.e. steps 420 to 450), then it is considered—along with any other candidate recovery AVs that are, in another iteration of this process, deemed to be potentially suitable—for selection as the recovery AV.

At step 460, if there is a single suitable candidate recovery AV, then it is selected from the remaining eligible candidate AVs as the recovery AV. Where a plurality of candidate recovery AVs remain at step 460, further assessments may be made to identify a single suitable candidate recovery AV, for example based on a lowest cost function, a nearest AV or selection based on a weighting of various capabilities.

If, however, it is assessed 470 that no recovery AV is suitable for selection at step 460, the process reiterates back to step 220 with the faulty AV reissuing the mayday message.

It will be appreciated that any combination and/or sequence of assessments can be made so as to select a recovery AV based on capability.

Alternatives and Modifications

In FIG. 1, the AVs are shown as so-called drones. In another example, the AVs include autonomous or semi-autonomous vehicles of any kind, such as: ground vehicles (including hovercraft and subterranean vehicles); marine vehicles (including submarines); aerial vehicles (including space vehicles); and hybrid such vehicles.

The designated task of an AV includes: delivery of the payloads; industrial operations, such as industrial or agricultural operations, including harvesting and/or depositing resources; telecommunications operations, including operating as a mobile remote access point and/or a repeater for a telecommunications network; construction or repair operations; and/or surveillance, rescue or reconnaissance operations. Accordingly, the AVs extend to any such vehicle capable of performing such operations.

In one example, the recovery operation is, or includes, retrieval of the first AV 110-1. Furthermore, the recovery operation includes delivery of the first AV 110-1 to a destination and/or disposal/destruction of the first AV.

In one alternative, if no single recovery AV is identified (after having attempted to do so after a predetermined length of time), then a plurality of AVs are selected together to act as recovery AVs—either at the same time (e.g. where no individual AV is capable of carrying the mass of the payload) or in sequence (e.g. where no individual AV has sufficient battery to complete the designated task).

In one example, the device-to-device communication is received by a candidate recovery AV from a faulty AV via any number of intermediate AVs (which themselves may or may not be candidate recovery AVs). Effectively, a mesh network of candidate recovery AVs is therefore available to facilitate propagation of the mayday message (e.g. beyond its range).

In yet another example, the mayday message is in the form of a so-called "last gasp" communication; this is particularly appropriate where there is failure of, at least, communication equipment of the faulty AV (e.g. due to insufficient battery power). Accordingly, the "last gasp" mayday message is configured to provide sufficient information to identify an appropriate recovery AV and then for the recovery AV to perform the recovery operation without further communication with the faulty AV.

In one example, the cargo bay of a faulty AV is a secured cargo bay, so as to prevent unauthorised access and retrieval of the payload. Accordingly, in order for a recovery AV to salvage the payload from the secure cargo bay, the recovery AV communicates with the faulty AV (when sufficiently proximate to one another) to authenticate itself to the first AV and indicate that it is authorised to salvage the payload. Upon receipt of a valid authentication, the faulty AV unlocks its cargo bay. It will be appreciated that this feature is most appropriate when the faulty AV is still capable of locking and unlocking its cargo bay and communicating with a recovery AV (e.g. when the faulty AV has sufficient battery). If the faulty AV is not, or does not expect to be, able to unlock its cargo bay only upon authentication of a proximate recovery AV (e.g. when it issues a mayday message as a "last gasp" communication), then the faulty AV unlocks its cargo bay by default (which may increase the risk of successful scavenging of the payload, but may also assist the recovery operation).

Each feature disclosed in the description, and (where appropriate) the claims and drawings may be provided independently or in any appropriate combination.

Reference numerals appearing in the claims are by way of illustration only and shall have no limiting effect on the scope of the claims.

The invention claimed is:

1. A method of controlling an Autonomous Vehicle (AV), comprising:
   detecting a fault in a first AV;
   in response to detecting said fault, transmitting a communication for alerting an AV of the fault, wherein said communication is a device-to-device wireless communication using protocols for cellular network communications;
   receiving said communication at a second AV;
   identifying, by the second AV using the communication, the second AV as being capable of retrieving at least part of the first AV and delivering said at least part to an intended destination; and
   instructing the second AV to perform the retrieving and delivering, wherein said instructing is performed through the, or a further, device-to-device wireless communication from the first AV asing protocols for cellular network communications.

2. The method of according to claim 1, wherein the at least part of the first AV is: a payload of the first AV; and/or the first AV.

3. The method according to claim 1, wherein instructing the second AV is performed by the first AV.

4. The method according to claim 1, wherein the, and/or the further, device-to-device wireless communication/s is/are received by the second AV via at least one intermediate AV.

5. The method according to claim 1, wherein the, and/or the further, device-to-device wireless communication/s is/are directly received by the second AV without retransmission by an intermediate AV.

6. The method according to claim 1, wherein the first AV detects the fault.

7. The method according to claim 1, wherein the first AV ceases travel in response to detecting the fault.

8. The method according to claim 1, wherein the, and/or the further, device-to-device wireless communication/s is/are comprised of a current location of the first AV.

9. The method according to claim 1, wherein the, and/or the further, device-to-device wireless communication/s is/are comprised of a future destination of the first AV.

10. The method according to claim 1, wherein the, and/or the further, device-to-device wireless communication/s is/are comprised of information regarding the at least part of the first AV that is to be retrieved and delivered.

11. The method according to claim 1, wherein the first AV is carrying a plurality of payloads to an / a plurality of intended destination/s, and wherein a plurality of second AVs are identified and instructed to retrieve and to deliver the plurality of payloads to the / the plurality of intended destination/s.

12. The method according to claim 1, wherein the first and/or second AV is unmanned.

13. The method according to claim 1, wherein the at least part of the first AV comprises a passenger.

14. The method according to claim 1, wherein the first and/or second AV is an aerial, marine and/or ground vehicle.

15. The method according to claim 1, wherein the transmitting of the device-to-device communication is performed in response to the first AV and/or the second AV being unable to communicate with a cellular wide area network.

16. The method according to claim 1, wherein the, and/or the further, device-to-device communication/s is/are communicated using a portion of the electromagnetic spectrum that is licenced for wide area cellular telecommunications.

17. A method according to claim 1, wherein the, and/or the further, device-to-device communication/s is/are an LTE Direct protocol-compliant communication.

18. The method according to claim 1, wherein at least a part of the, and/or the further, device-to-device communication/s is/are encrypted.

19. An Autonomous Vehicle (AV) comprising:
    a receiver for receiving at least one communication providing notice that a faulty AV has a fault and instructions to retrieve at least part of the faulty AV and to deliver said at least part to an intended destination, wherein said at least one communication is a device-to-device wireless communication using protocols for cellular network communications;
    storage for carrying a payload; and
    a processor configured to:
      identify, using the at least one communication, the AV as being capable of retrieving at least part of the faulty AV and delivering said at least part to an intended destination; and
      process the at least one communication thereby to instruct the AV to retrieve, by using the storage, at least part of the faulty AV and to deliver said at least part to the intended destination.

20. A system for managing Autonomous Vehicles (AVs) for delivering a payload, comprising:
    a first AV comprising:
      a detector for detecting a fault in the first AV; and
      a transmitter for transmitting a communication for alerting a second AV of the fault, wherein said communication is a device-to-device wireless communication using protocols for cellular network communications;
    a second AV comprising:
      a receiver for receiving, from the first AV, the, or a further, device-to-device wireless communication using protocols for cellular network communications;
      storage configured to carry a payload; and
      a processor for:
        identifying, using the communication, the second AV as being capable of recovering at least part of the first AV and of delivering said at least part to an intended destination; and processing the, or the further, device-to-device wireless communication using protocols for cellular network communications thereby to instruct the second AV to perform the recovering and delivering.

21. The method according to claim 1, wherein the at least part of the first AV is: a payload of the first AV or the first AV.

22. The AV of claim 19 further comprising a transmitter configured to send a response to said at least one -communication to the faulty AV, wherein said response is a device-to-device wireless communication using protocols for cellular network communications.

* * * * *